(12) United States Patent
Bernardi

(10) Patent No.: US 10,408,193 B2
(45) Date of Patent: Sep. 10, 2019

(54) SYSTEM WITH ORBITING AXIS FOR CONVERTING ENERGY

(71) Applicant: Ubaldo Bernardi, Roccabernarda (IT)

(72) Inventor: Ubaldo Bernardi, Roccabernarda (IT)

( * ) Notice: Subject to any disclaimer, the term of this patent is extended or adjusted under 35 U.S.C. 154(b) by 211 days.

(21) Appl. No.: 15/533,616

(22) PCT Filed: Dec. 10, 2015

(86) PCT No.: PCT/IB2015/059500
§ 371 (c)(1),
(2) Date: Jun. 6, 2017

(87) PCT Pub. No.: WO2016/097944
PCT Pub. Date: Jun. 23, 2016

(65) Prior Publication Data
US 2017/0335826 A1    Nov. 23, 2017

(30) Foreign Application Priority Data

Dec. 17, 2014 (IT) .............................. CZ14A000019
Nov. 25, 2015 (IT) .............................. UB15A005879

(51) Int. Cl.
*F03D 15/10* (2016.01)
*F03D 5/06* (2006.01)

(52) U.S. Cl.
CPC ............... *F03D 15/10* (2016.05); *F03D 5/06* (2013.01); *F05B 2250/313* (2013.01); *F05B 2260/503* (2013.01); *Y02E 10/70* (2013.01)

(58) Field of Classification Search
CPC .................................. F03D 15/10; F03D 5/06
See application file for complete search history.

(56) References Cited

U.S. PATENT DOCUMENTS

| 1,352,952 | A | * | 9/1920 | Gracey | ................... F03D 3/067 416/118 |
| 2,151,172 | A | | 3/1939 | Villarreal | |
| 4,097,190 | A | * | 6/1978 | White | ..................... F03D 3/068 416/111 |
| 4,618,312 | A | * | 10/1986 | Williams | ................ F03D 3/068 416/119 |
| 4,619,583 | A | | 10/1986 | Wikstrom | |

(Continued)

*Primary Examiner* — Stephen K Cronin
*Assistant Examiner* — Anthony L Bacon
(74) *Attorney, Agent, or Firm* — Harness, Dickey & Pierce, P.L.C.

(57) ABSTRACT

A system with orbiting axis for converting energy from a fluid includes an inner transmission shaft and an output transmission shaft; a sectorial blade configured to exchange energy with the fluid and connected to the inner transmission shaft by a support element pivotable such that the blade is configured to rotate around an axis of the inner transmission shaft; a for synchronization and transmission of rotation-oscillation movement of the blade and including the inner transmission shaft and the output transmission shaft. The support element is hinged to the inner transmission shaft by a first rotator rigidly connected, at a first extremity, with the support element by a pin and, at a second extremity, to one of the transmission shafts, each blade being configured to perform the rotation-oscillation movement integrally with the support element and always oriented in the direction of the fluid.

10 Claims, 15 Drawing Sheets

(56) References Cited

U.S. PATENT DOCUMENTS

| | | | |
|---|---|---|---|
| 6,000,907 A | 12/1999 | Bic | |
| 6,682,296 B1 * | 1/2004 | Jonsson | F03B 17/065 |
| | | | 415/3.1 |
| 7,083,382 B2 * | 8/2006 | Ursua | F03D 3/005 |
| | | | 416/110 |
| 2008/0304965 A1 | 12/2008 | Syrovy | |
| 2011/0076144 A1 * | 3/2011 | Lucas | F03B 17/067 |
| | | | 416/79 |

* cited by examiner

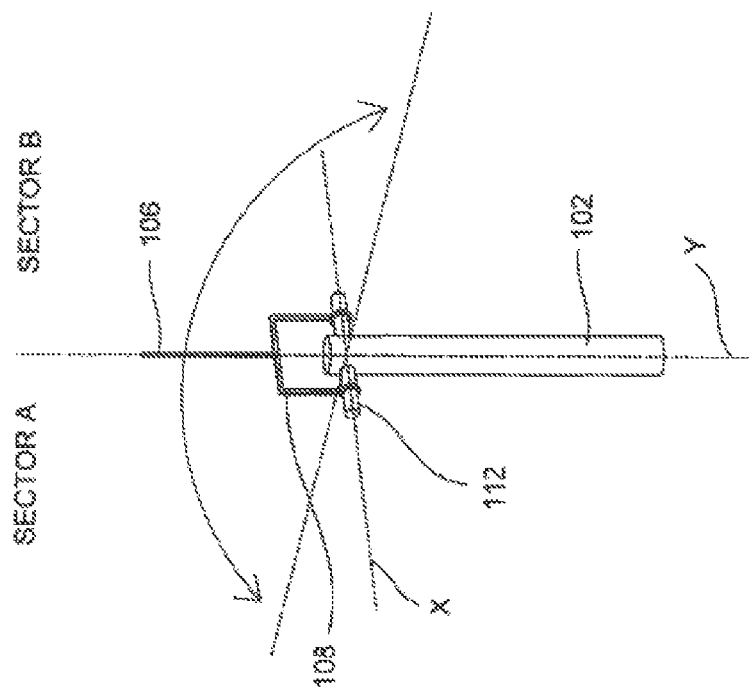
Fig.5
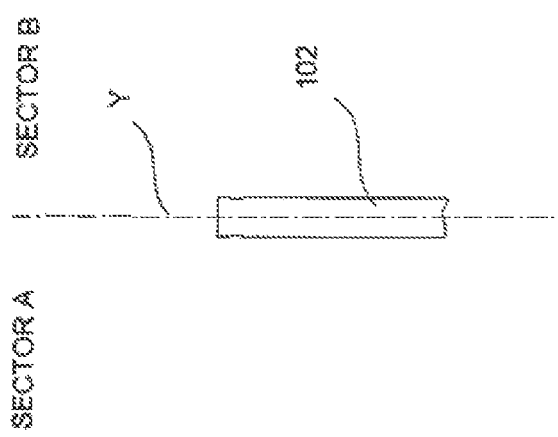

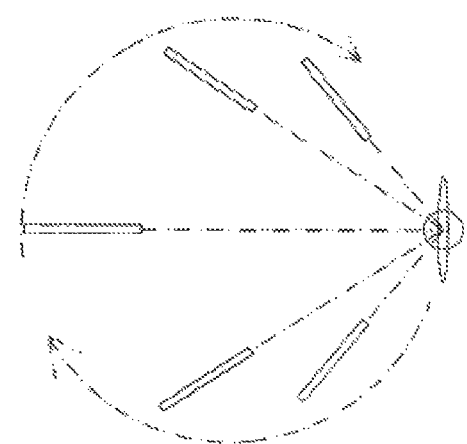
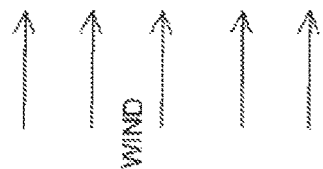
Fig. 5E
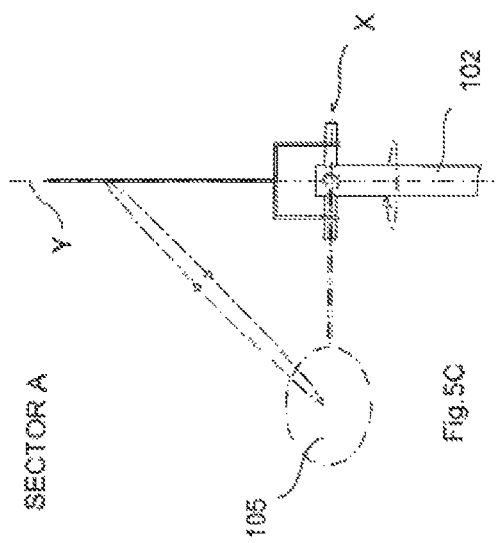
Fig. 5C
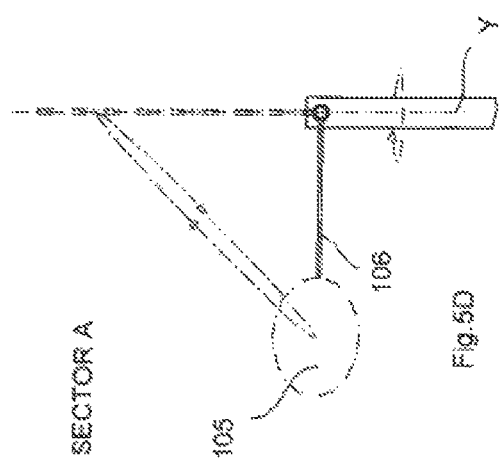
Fig. 5D

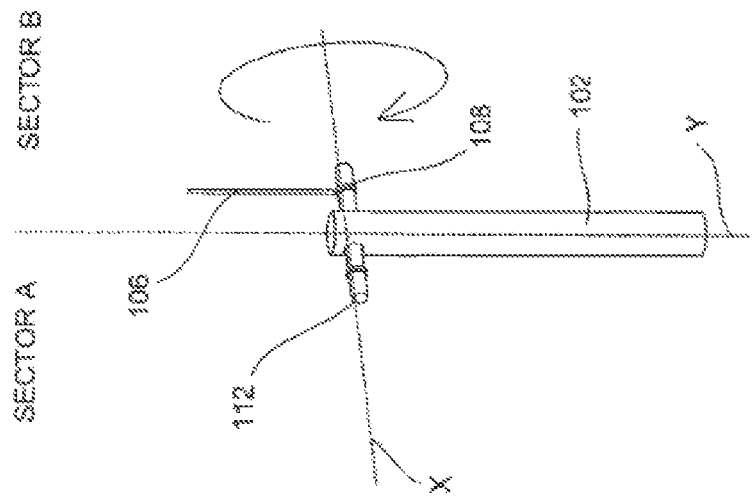
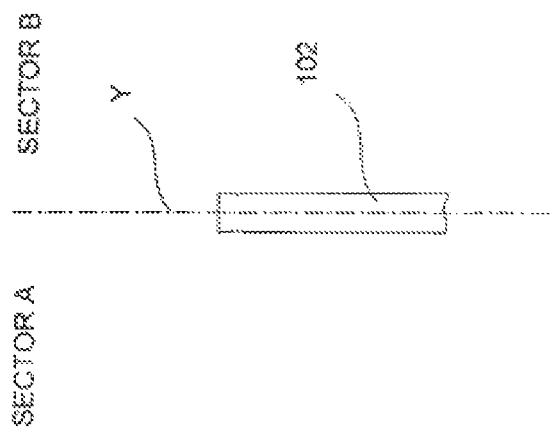
Fig. 6

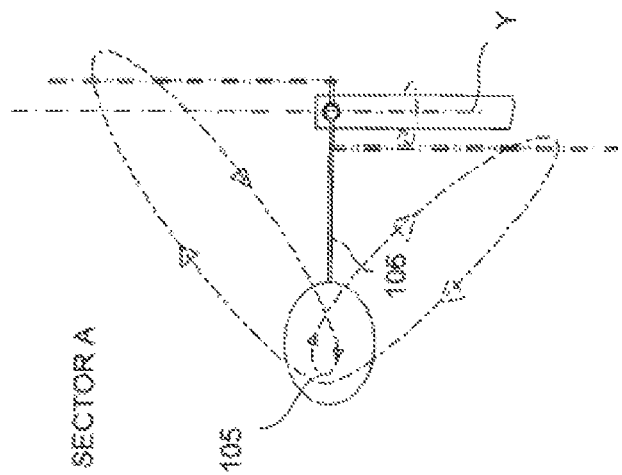
Fig. 6D
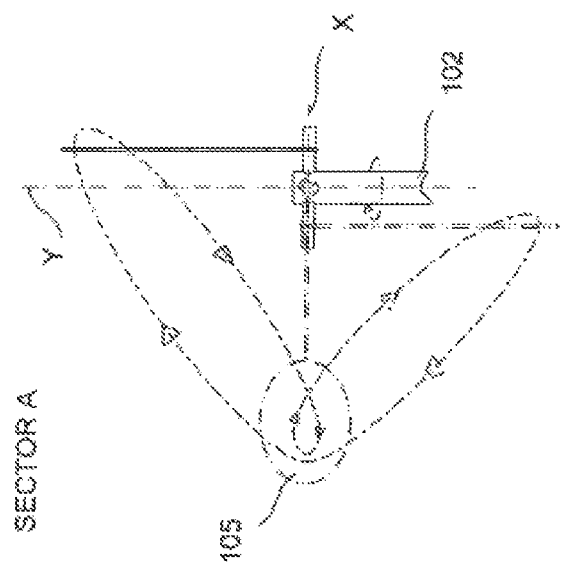
Fig. 6C
Fig. 6

SYSTEM WITH ORBITING AXIS FOR CONVERTING ENERGY

BACKGROUND

Technical Field

The present invention relates to a system with orbiting axis for converting energy.

In particular, the present invention relates to a system with orbiting axis for converting energy, of the type based on operating fluid both as a driving machine and a operating machine.

Description of the Related Art

As it is known, a system for converting energy of the fluid-type can convert the energy possessed by a fluid into mechanical energy or vice versa.

However, such machines suffer of the problem do not have a high efficiency due to the configuration of the blades that are not automatically adjustable in the direction of the fluid current, and to have a limited range and to rotate with respect to a single horizontal or vertical axis.

A solution to this problem is described in the US Patent Application Publication No. 2008/0304965 published on Dec. 11, 2008, which discloses pairs of oscillating wind paddles mounted in the lee of a wind turbine of the lift type. An oscillating wind paddle assembly has an upper pair of paddles moving between a first portion at substantially right angles to the direction of wind and a second position substantially parallel to the direction of the wind and mounted on arms extending to either side of a shaft to which they are connected through a one-way clutch, and a lower pair of paddles moving between a position at substantially right angles to the direction of the wind and a second position substantially parallel to the direction of the wind and mounted on arms extending to either side of the same shaft to which they are connected through a one-way clutch, one of the paddles being a drive paddle and the other a recovery paddle, the two pairs of paddles being out of phase with respect to one another.

The problem of this solution is that, since it is a turbine having only one axis of rotation of the paddles, so it is like a horizontal axis or a vertical axis based turbine, it is not able to generate high couple of forces in order to drive a gearbox. Furthermore, the blades and their support arm are always aligned to their arms and so they do not pass from horizontally to vertically and vice versa.

BRIEF SUMMARY

An aim of the present invention is to provide a system with orbiting axis for converting energy of simple and economical construction which is able to generate high couple of forces in order to drive a gearbox and to accumulate and reuse energy in the direction of the fluid current, thus having characteristics such as to overcome the limits which still affect the systems for converting energy previously described with reference to the known art. In particular, the aim of the present invention is to provide a system with orbiting axis for converting energy working simultaneously on two mutually perpendicular axes, equal in every embodiment.

According to the present invention, a system with orbiting axis for converting energy is provided.

BRIEF DESCRIPTION OF THE SEVERAL VIEWS OF THE DRAWINGS

For a better understanding of the present invention a preferred embodiment is now described, purely by way of non-limiting example, with reference to the accompanying drawings, in which:

FIGS. 5A-5B show a schematic view of the simultaneous rotation of the shaft of the system of FIG. 1 around a vertical Y axis and a horizontal X axis, according to the invention;

FIGS. 5C-5E show schematic views respectively of a blade of the system of FIG. 1 according the simultaneous rotation shown in FIG. 5A-5B connected to the shaft by means of pin and hinge in a vertical position, the blade in horizontal position in a sector A of the space after a 90° rotation of the shaft around the Y axis and simultaneous rotation around the X axis, and the blade in different positions in the space under the wind effect, according to the invention;

FIGS. 6A-6B show a schematic view of the simultaneous rotation of the shaft of the system of FIG. 1 around a vertical Y axis and a horizontal X axis, according to the invention;

FIGS. 6C-6D show schematic views respectively of the blade of the system of FIG. 1 according the simultaneous rotation shown in FIG. 6A-6B connected to the shaft by means of pin and hinge in a vertical position, the blade in horizontal position in a sector A of the space after a 90° rotation of the shaft around the Y axis and simultaneous rotation around the X axis, and the blade in different positions in the space under the wind effect, according to the invention;

DETAILED DESCRIPTION

Figure 1:
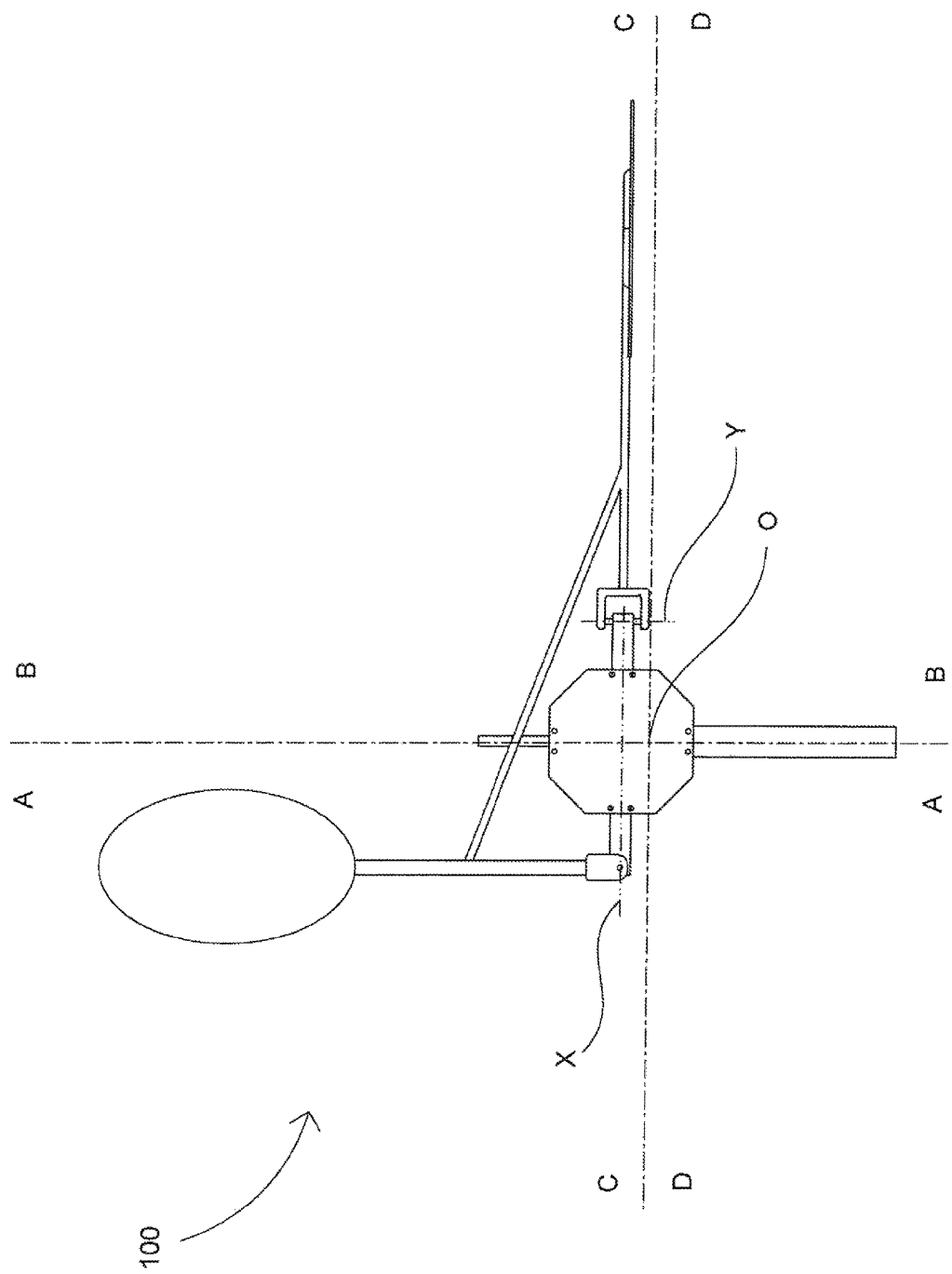
FIG. 1 shows a schematic bi-dimensional view of a first embodiment of the system with orbiting axis for converting energy, according to the invention.
Figure 2:
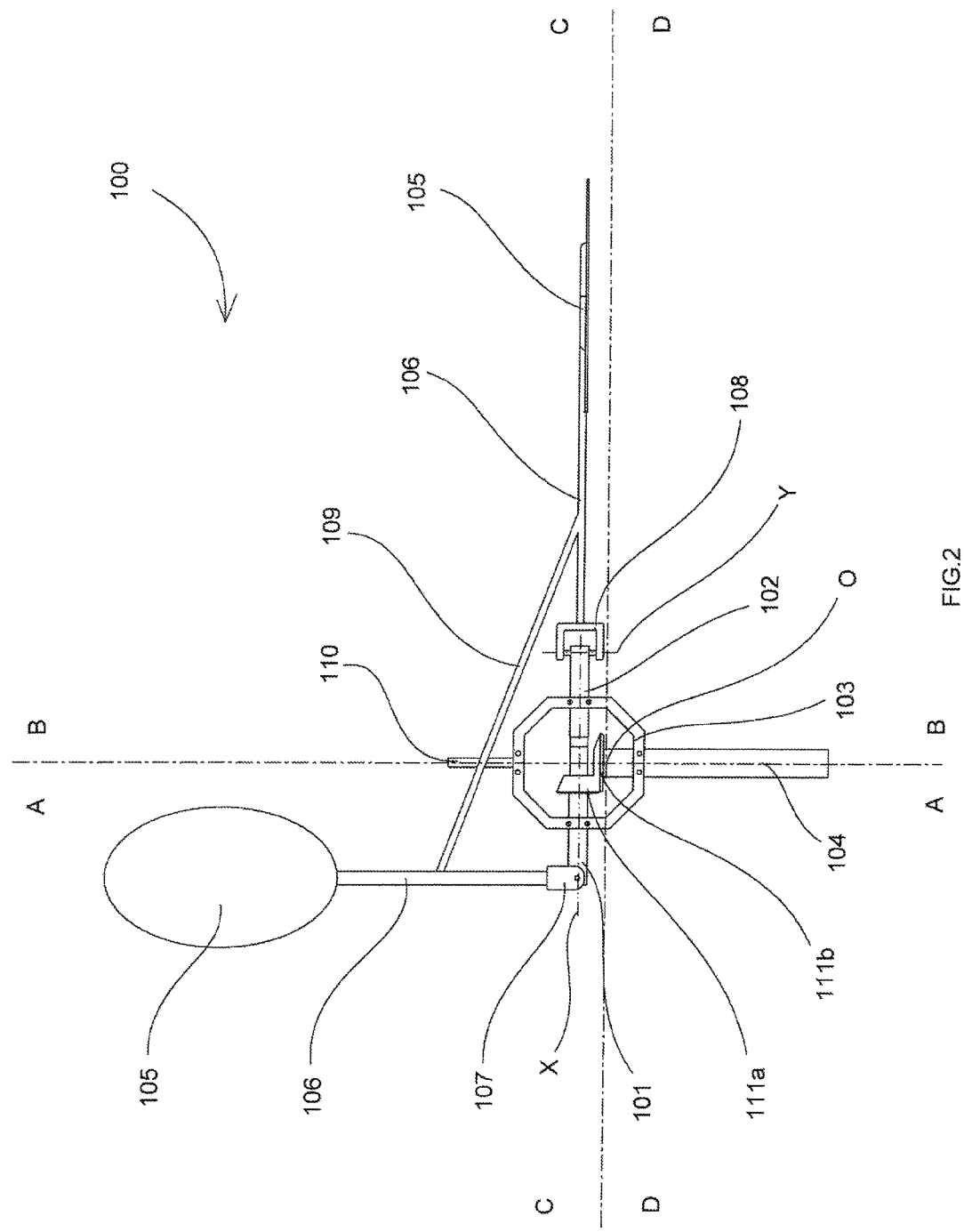
FIG. 2 shows a detailed schematic bi-dimensional view of the first embodiment of a system with orbiting axis for converting energy, according to the invention.
Figure 3:
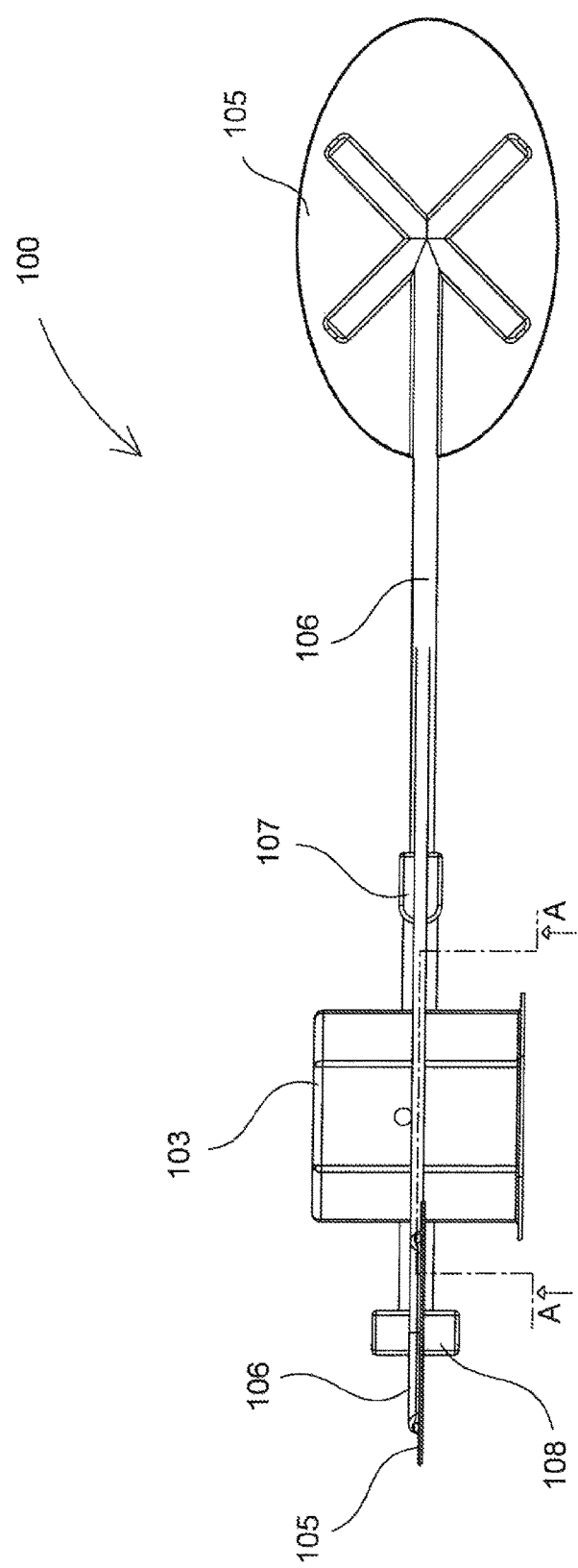
FIG. 3 shows a schematic top view of a group for synchronization and transmission of the movement of the first embodiment of the system with orbiting axis for converting energy, according to the invention.

With reference to these figures and, in particular, to FIGS. 1-4, a first embodiment of a system with orbiting axis for converting energy is shown, according to the invention. More in details, the system with orbiting axis for converting energy 100 comprises an inner transmission shaft with internal gearing 101; an inner transmission shaft with external gearing 102; a motion synchronization and transmission group 103; an output transmission shaft 104; two sectorial blades 105, one vertical blade 105 and a one horizontal blade 105, connected to the motion synchronization and transmission group 103 by means of supporting structures or elements 106, each pivoting around one of the transmission shafts 101 and 102 by means of hinges 107 and 108; an interconnection device 109 for interconnecting the sectorial blades 105, for example a rod able to oscillate.

According to an aspect of the invention, a first end of the transmission shaft with internal gearing 101 is interconnected at a first end of the transmission shaft with external gearing 102 in such a way as to form a single drive shaft which determines a simultaneous motion of the blades 105. Moreover, motion synchronization and transmission group 103 comprises toothed conical gears 111a and 111b respectively keyed on the shafts 101 and 104 and which act as organs of transmission of motion. The output transmission shaft 104 is fixed at an upper end to the synchronization and transmission group of motion 103, in particular, to the toothed conical gear 111b which is rigidly connected to the conical gear 111a coupled, in turn, to a first end of the transmission shaft 101. In this way, the output transmission shaft 104 is rigidly connected to the transmission shafts 101 and 102.

Figure 4:
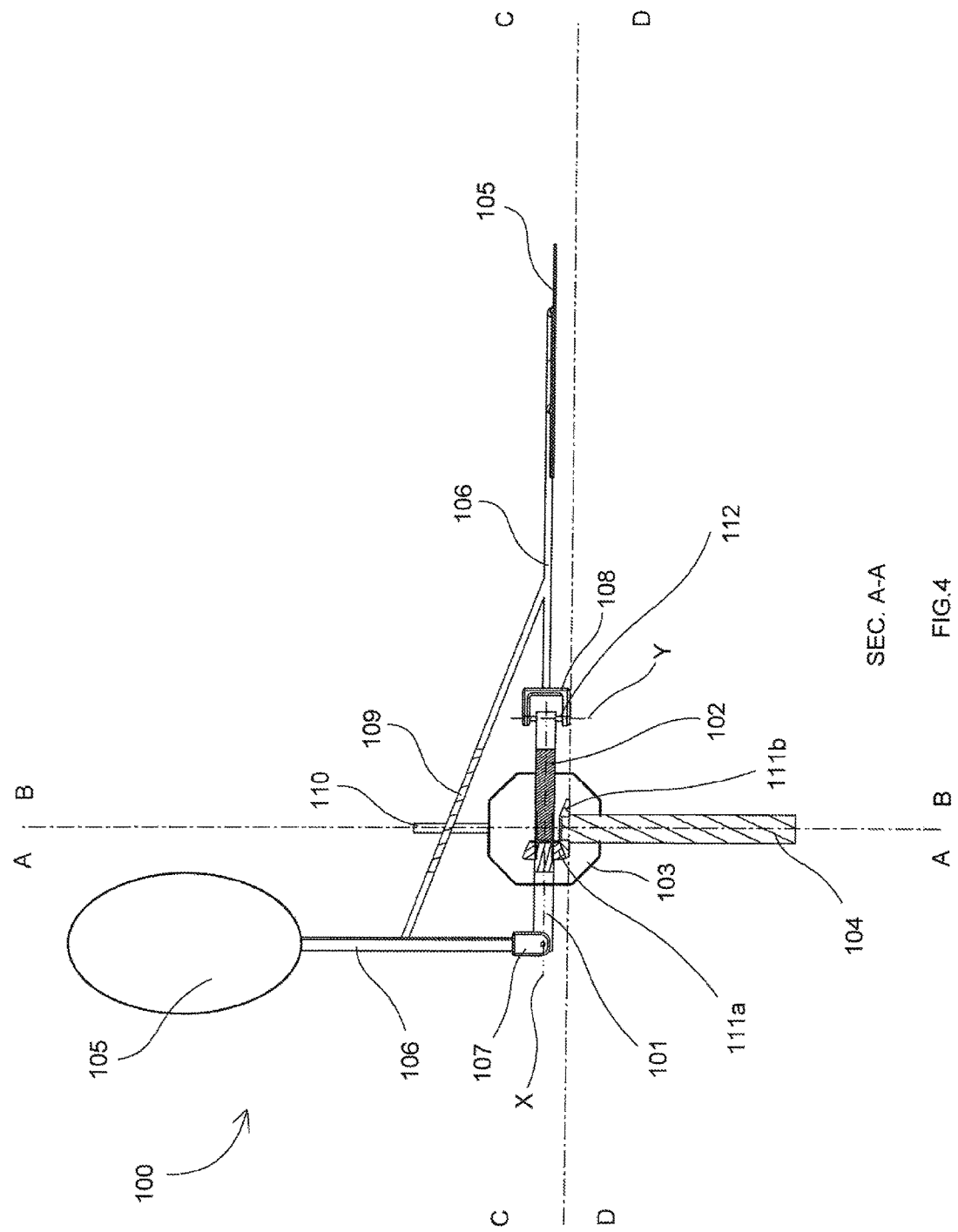
FIG. 4 shows a schematic a bi-dimensional view along the section A-A of the first embodiment of the system with orbiting axis for converting energy comprising mechanical transmission members, according to the invention.
Figure 7:
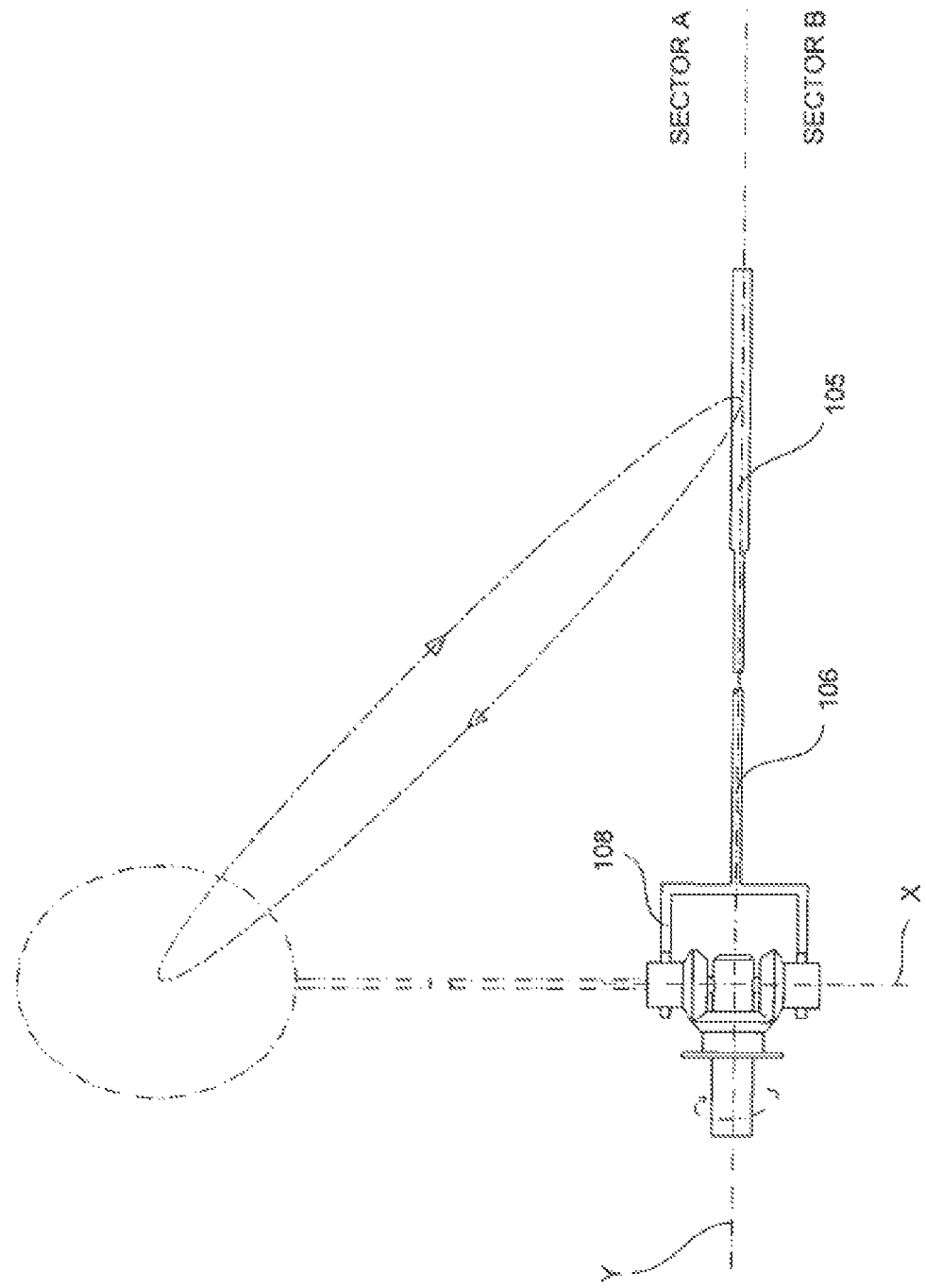
FIG. 7 shows a more detailed schematic view of the blade moving from a vertical position to a horizontal position in the sector A of the space, according to the invention.
Figure 8:
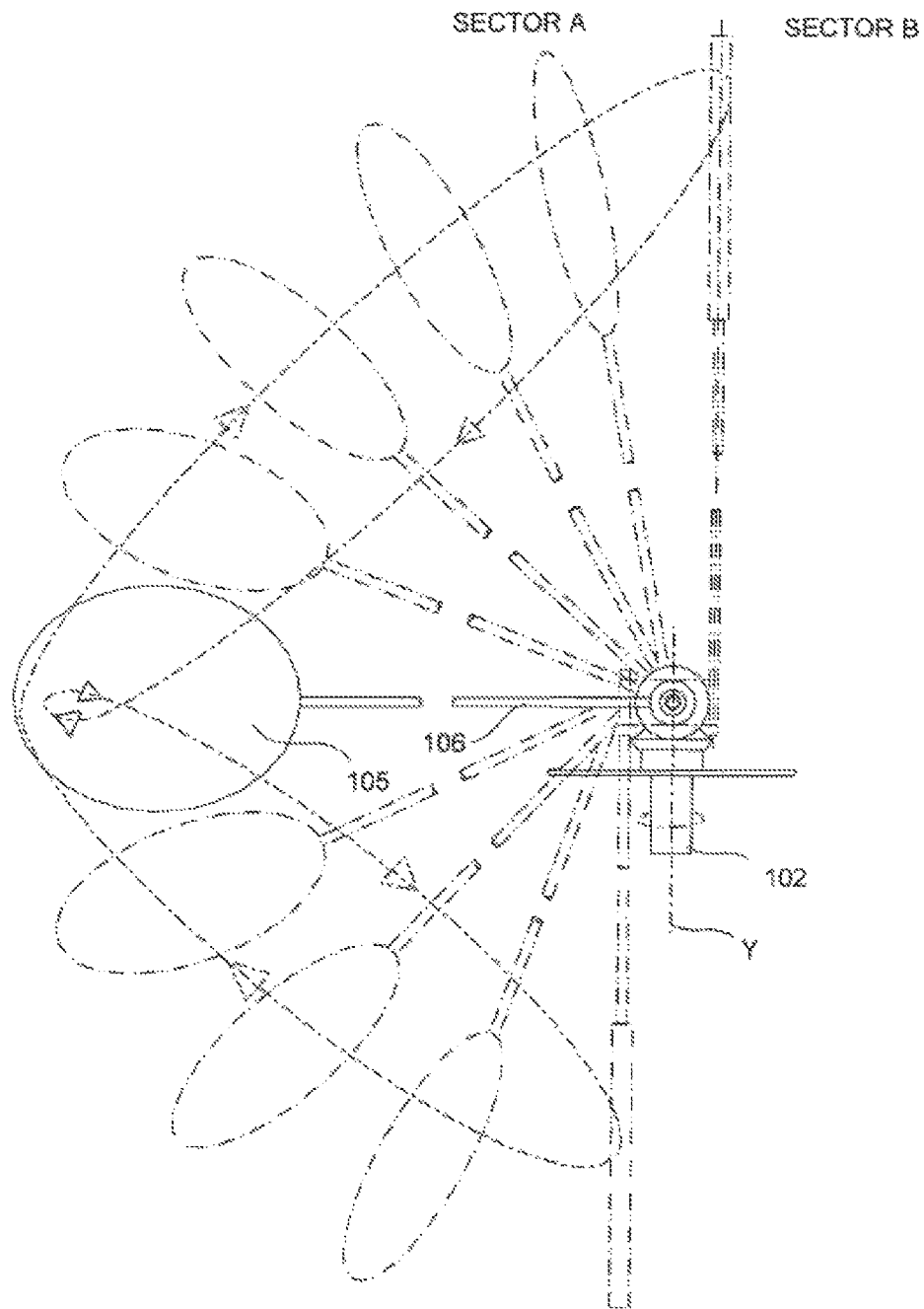
FIG. 8 shows a schematic view of the blade oscillating between the vertical and horizontal position during the rotation of the shaft and hinge around the Y axis, according to the invention.

As shown in FIG. 4, according to the first embodiment. Each transmission shaft 101 and 102 is interconnected perpendicularly to transmission pins 112 and consequently to hinges 107 and 108. Each hinge 107 and 108 is rigidly connected to a supporting element 106. Thanks to the hinges 107 and 108 the sectorial blades 105 can oscillate, integrally to the supporting element 106, respectively around the axis of the transmission pins 112. Therefore, the synchronization of the supporting elements 106 is performed by means of the transmission shafts 101, 102, the transmission pins 112 and the interconnection device 109 which acting on the fulcrum 110 generates the blades' oscillation around the pins 112.

Advantageously according to the invention, each sectorial blade 105 is rigidly connected to the corresponding supporting structure 106, constituting a single body with this.

According to an aspect of the invention, the sectorial blades 105 are rigidly interconnected by means of the interconnect device 109. In such a configuration of the system for converting energy 100, the motion synchronization and transmission group 103 has an element 110 acting as a fulcrum for generating the oscillation of the blade 105.

FIGS. 5-8 are provided to better explain how the blades operate. More specifically, the FIG. 5A shows the shaft 102 having a rotation axis coincident with a Y axis of a reference system, dividing the space in a sector A and in a sector B. FIG. 5B shows the shaft 102 having the pin 112 connected perpendicularly to it and to which the supporting element 106 is connected by means of the hinge 108, in order the supporting element 106 can oscillate around the pin 112. In the same way, FIG. 6A-6B show the shaft 102 having a rotation axis coincident with a Y axis of a reference system, dividing the space in a sector A and in a sector B but in this from the supporting element 106 is rigidly connected to the pin 112 by the hinge 108. The rotation of the pin 112 around the X axis imply the rotation of the supporting element 106. The FIGS. 5A-5C show this oscillation of the supporting element 106 with the blade 105 according to the system shown in FIGS. 5A-5B, while the FIGS. 6C-6D show the system according the FIGS. 6A-6B. Moreover, by means of the transmission and synchronization group 103, the shaft 102 and the supporting element 106 are constrained to rotate with the same angular speed by means of the transmission and synchronization group 103. Thus, referring to FIGS. 7 and 8, the system can operate in only one sector, A or B, depending on the rotation direction. It is sufficient to imagine the supporting element as the apothem of a rotation cone having the vertex coincident with the cross point between the axis X and Y. The blade fixed on the supporting element will be able to exchange energy with a fluid like air. The blade is always oriented in the direction of the fluid during the different positions occupied while performing a complete rotation. This is the reason why the system is highly efficient. In fact, the supporting element 106, during a whole conic rotatory cycle, is placed parallel to the X axis just for an instant and then is placed perpendicularly to it, so that the blade 105 is in a positive exchange of energy with the fluid. This allows to use the fluid motion to obtain energy (eolic, hydrodynamic) or as a propulsor element to provide energy to the blade.

Figure 9:
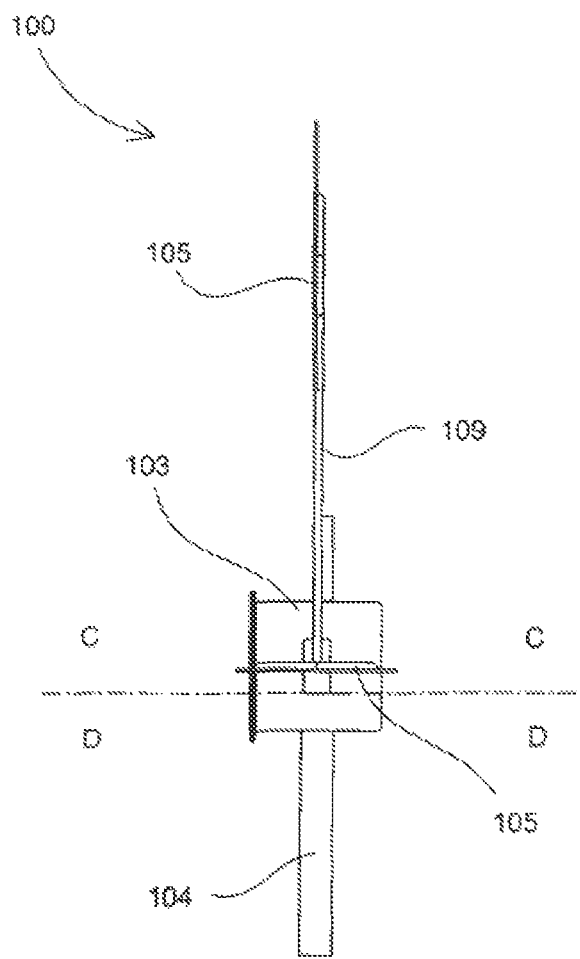
FIG. 9 shows a schematic lateral view of the of the first embodiment of the system with orbiting axis for converting energy, according to the invention.

As even better highlighted in the FIG. 9, the sectorial blades 105 with the respective supporting structures 106 are arranged with the respective axes at 90° one from the other and oriented with the normal of their surfaces at 90° one from the other, for example the normal of the vertical blade 105 oriented towards the left being perpendicular to that one of the horizontal blade 105 oriented downward. In particular, the sectorial blades 105 are to occupy and work in different spaces completely separated from each other, but contiguous. More precisely, considering the space divided into four quadrants, two of which are indicated with the letters A and B (respectively the left sector and the right sector) and two of which are indicated with the letters C and D (respectively the upper sector and the lower sector) that intersect at a central point O of the specific case reference system, the vertical blade 105 occupies the quadrant C-A of the space in which it is configured to operate, and in particular to oscillate, and the horizontal blade 105 occupies the quadrant C-B of the space in which it is configured to operate, in particular to oscillate. In this particular configuration of the system 100 the blades 105 are each in their own quadrant of the working area, each quadrant of a blade being distinguished and separated from the quadrant of the other blade, and, in their quadrant, the blades can oscillate around a Y-axis perpendicular to the axis X and passing through the pins 112.

According to an aspect of the invention, in order the oscillation takes place correctly, the blades 105 must be arranged at 90° between them and at a predetermined distance from each other.

According to another aspect of the invention, the angle between the blades is 90° (that is the angle between their normal).

Advantageously according to the invention, the blades 105, being out of phase by 90°, are configured to receive the thrust of the fluid or vice versa to transmit it to the fluid for the entire excursion of blades oscillation.

Advantageously according to the invention, the number of the sectorial blades 105 and of the transmission and synchronization means, such as toothed conical gears 111a and 111b, is variable and can be a multiple of two. In this case, advantageously according to the invention, more sectorial blades can be moved with an oscillatory motion through further transmission organs.

Advantageously according to the invention, through the motion synchronization and transmission group 103, (which comprises the transmission shafts 101, 102, the hinges 107 and 108 and the pins 112), the blades can perform an oscillating movement under the action of a fluid, such as air. This fluid can transmit energy to the blades or receive energy from the blades.

Figure 10:
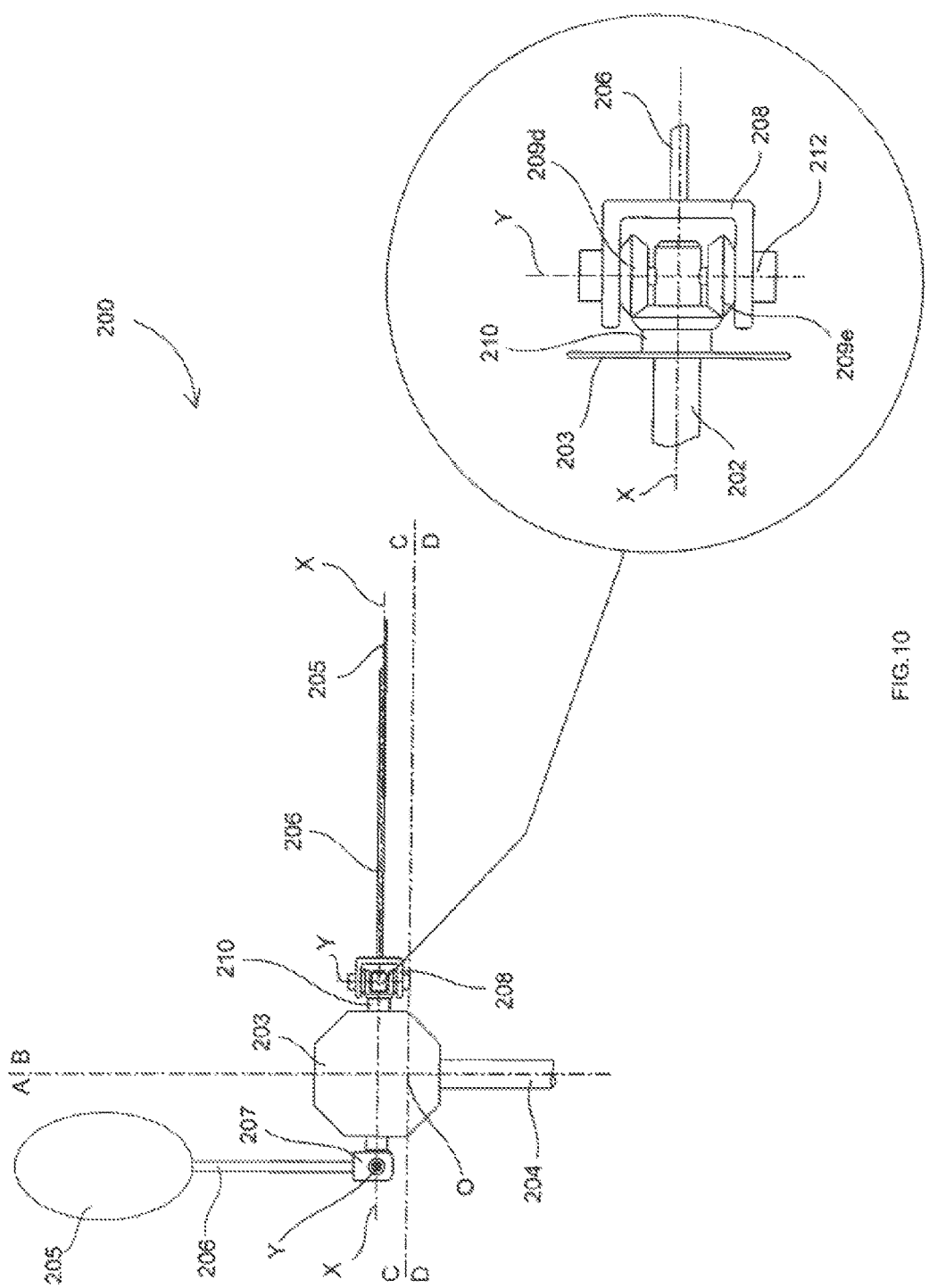
FIG. 10 shows a perspective view of a second embodiment of the system with orbiting axis for converting energy and of an enlarged view of the group for synchronization and transmission of the movement of the second embodiment, according to the invention.

FIG. 10 shows a portion of a second embodiment 200 of the system with orbiting axis for converting energy having multi-sectorial blades 205 extending from the shaft 202 to a blade 205. The synchronization of each blade 205 is made by a group of three conical gears 210, 209d, 209e in the ratio 1:1 for each of the blades 205. In particular, the first conical gear 210 is installed on a transmission group 203 with the transmission shaft 202 coaxial and free to rotate, the other two 209d and 209e are rigidly connected within a hinge 207 positioned in the quadrant A-C, and within a hinge 208. According to an aspect of the invention, the gearing of the fixed gears 210 is present only in a part of the crown, the other part is smooth. The two side gears 209d and 209e coaxial to the pin 212 and free to rotate mesh the fixed gear 210 alternately, thus achieving the oscillation of the supporting structure 206 and the synchronization of the movements between the blades 205. The two gears 209d and 209e form a single block with the supporting structure 206 on which the blade 205 is fixed, by means of the hinge 207 and 208, to which are coupled by means of the pin 212. In this embodiment, the supporting elements 206 perform a conical rotation in the sectors C-A and C-B integrally to the blades 205.

Thus, in the first and in the second embodiment the blade only oscillates around the axis of the pins 112 or 212.

Advantageously according to the invention, the blades of the system with orbiting axis for converting energy are in configuration such as to always work in the direction of the fluid, regardless of whether they are used for receiving energy or for providing energy.

Advantageously according to the invention, the transmission group is provided with appropriate inputs on three sides, such as to enable the inputs/outputs of the transmission shafts and is configured in a way that allows the sectorial blades to move in the direction of the fluid flow impinging on the blades.

During operation, therefore, the system with orbiting axis for converting energy, according to the invention, receives energy from a moving fluid. For example, the system is configured to receive wind power from the wind or, alternatively, to receive energy from marine or rivers water currents. At the same time, for the principle of reverse operation, the system with orbiting axis for converting energy is able to act as a driving member for generating energy, in particular by supplying energy to the blades by means of, for example, an electric motor connected to the transmission shafts. Therefore, the system with orbiting axis for converting energy performs the task of an intermediary organ capable of transferring to a shaft the kinetic energy possessed by a fluid or, conversely, to transfer to a fluid the mechanical energy possessed by a tree.

More precisely, using the first embodiment of the system with orbiting axis for converting energy, the first blade that is in engaged with the fluid and which, therefore, receives or transmits the thrust useful for the purposes of the motion, isn't influenced by the other blade. In fact, since the second blade is out of phase of 90° respect to the first blade, the second blade is located in a direction parallel to the fluid and, therefore, it neither receives nor transmits thrust, namely it is discharged. Work together in every position and are always in the wind direction.

Basically, due to the non-interaction between the blades, each of them is always subject to a positive push from the flow of fluid and, consequently, the system thus having a optimal efficiency.

Figure 11:
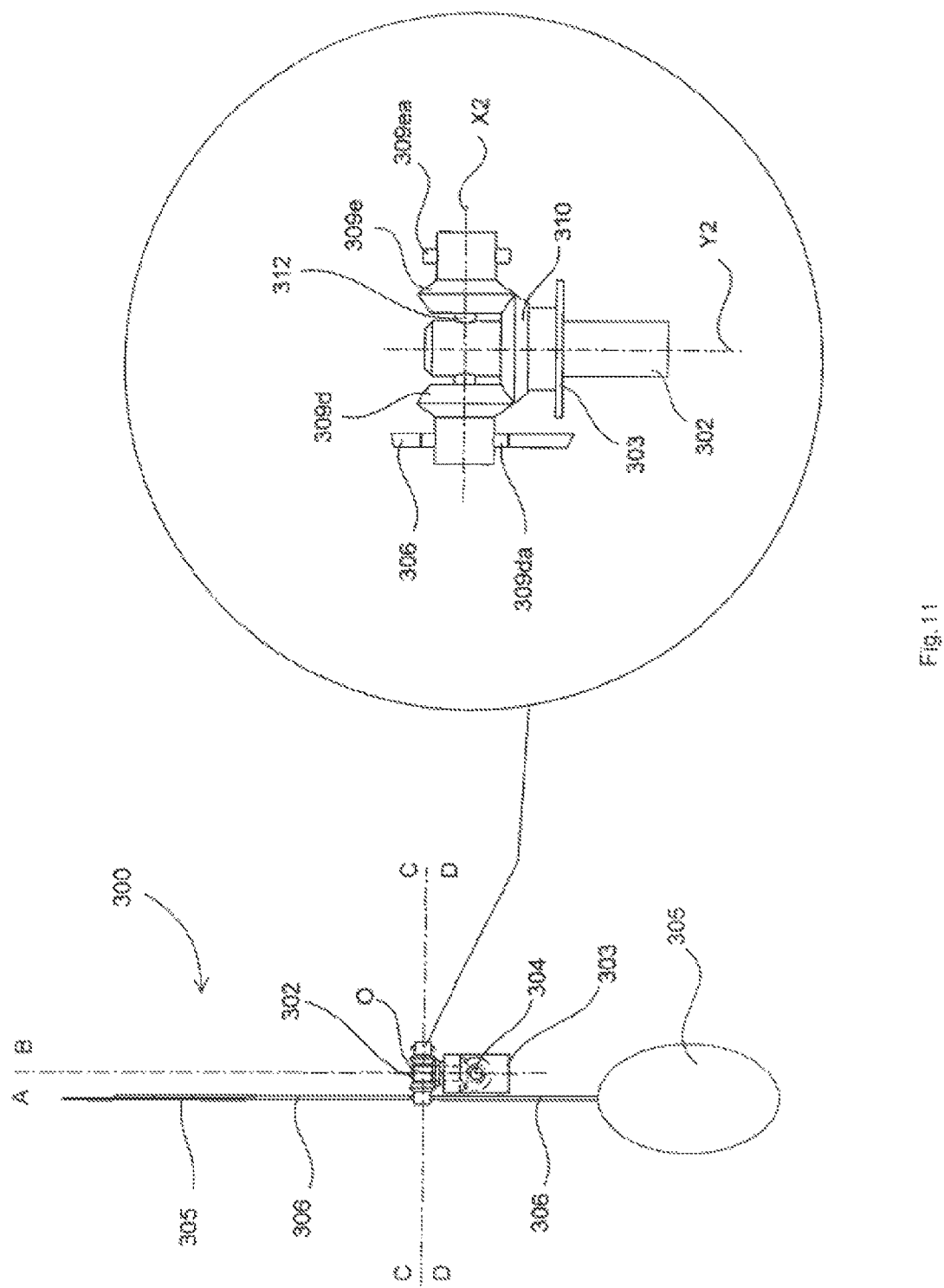
FIG. 11 shows a perspective view of a third embodiment of the system with orbiting axis for converting energy and of an enlarged view of the group for synchronization and transmission of the movement of the fourth embodiment, according to the invention.

The FIG. 11 shows a third embodiment 300 in which the supporting structures 306 supporting a first upper blade 305 and a second lower blade 305 are rigidly connected, for example by means of the ends threaded to the seats 309da of the conical gear 309d.

The blades 305 are arranged so as they have the supporting structures 306, shifted from each other by 180°, exiting from the plane of the conical gear 309d and having the normal to the surface at 90° one from the other, one of these displaced and operating into the sector A and the other one in the sector B.

The conical gear 309d, the conical gear 309e and the shaft 302, linked via the pin 312, rotate together with respect to an axis Y2 of the shaft 302, and at the same time the conical gears 309d and 309e rotate with respect to its own axis X2 on the conical gear 310 integral with the group 303. Therefore during operation, the pair of blades 305 placed at left of the shaft 302 occupies the right half space B orbiting in this, since the Y2 axis is vertical. If Y2 was horizontal then the blades 305 would occupy the upper half-space C or lower half-space D, depending on the case.

According to an aspect of the invention, the system may comprise a single sectorial blade 305, for example connected to the gear 309e operating in the sector C via the ends threaded to the seat 309da, and a counterweight placed at 180° with respect to the blade 305 in the lower half-space D.

According to another aspect of the invention, the system 300 may comprise a pair of right blades and a pair of blades on the left of the shaft 302 connected respectively to the gears 309d and 309e.

Figure 12A:
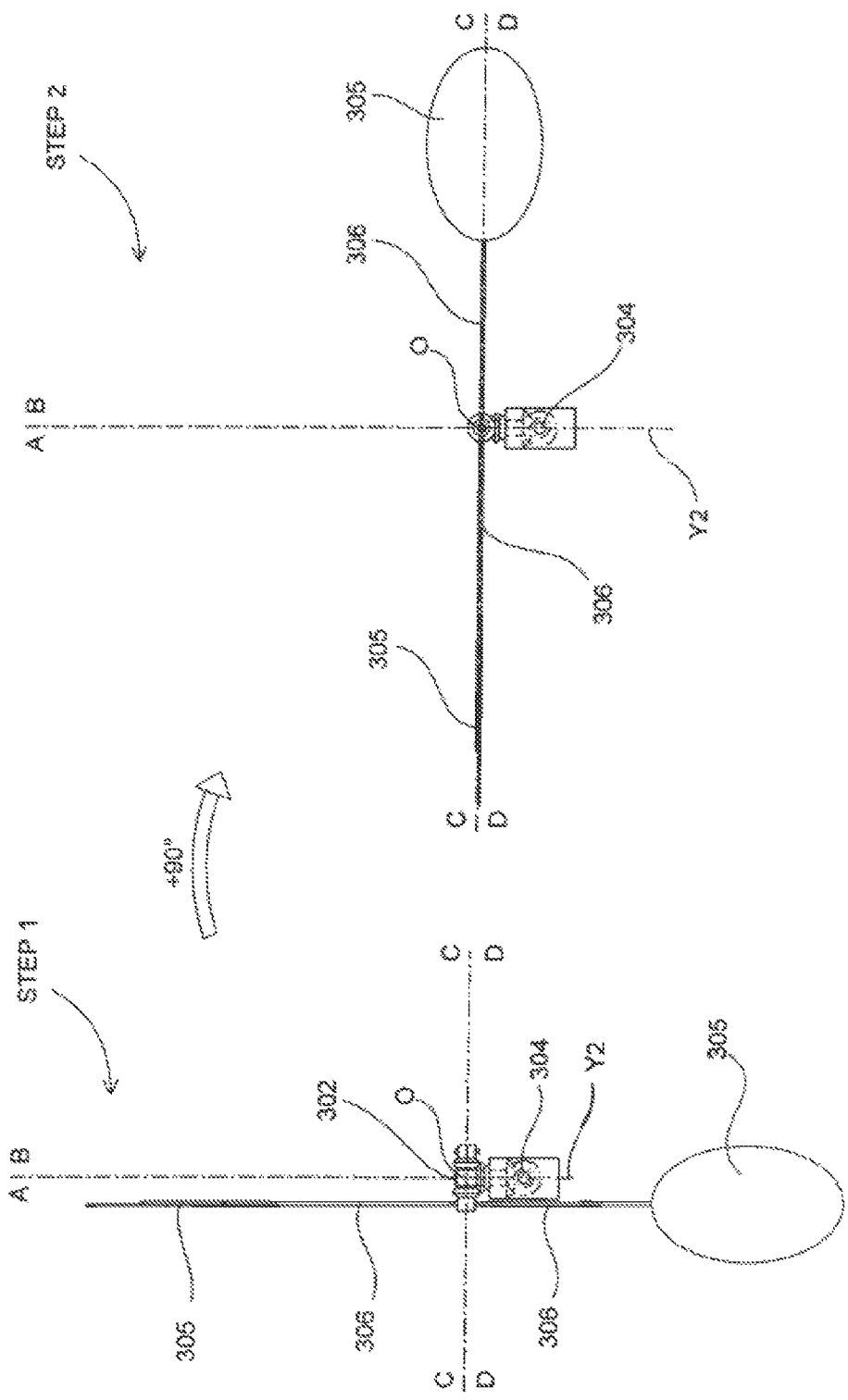
FIGS. 12A-12B show a perspective view of the operating steps of the third embodiment of the system with orbiting axis for converting energy, according to the invention.
Figure 12B:
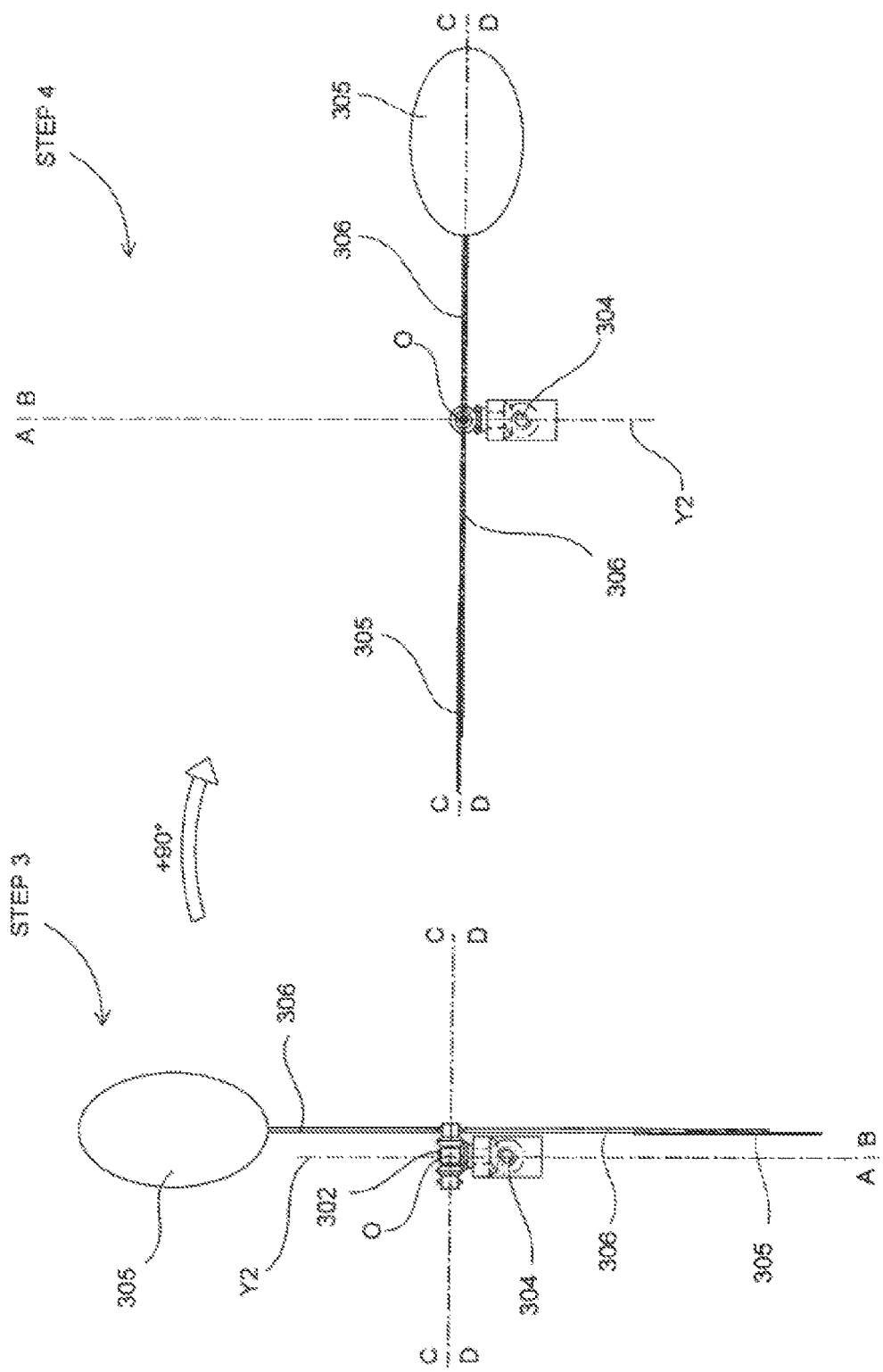

In more detail, as shown in FIGS. 12A-12B, the operation of the system 300 with a single pair of blades 305 can be schematized in 4 steps, for example, the step 1 is representative of a configuration in which the pair of blades 305 is placed on the left of the shaft 302 in a vertical position, with the first blade 305 positioned in the half-space C and oriented with the normal to the surface on the left, and the second blade 305 positioned in the half-space D and oriented with the normal to the surface outgoing from the sheet. A 90° rotation of the shaft 302 around axis Y2 involves the passage to the step 2 in which the pair of blades 305 is arranged horizontally with the first blade 305 on the right of the shaft in the half-space B and with the normal to the surface leaving the sheet and the second blade 305 on the left of the shaft 302 in the half-space A and with the normal to the surface facing downwards. It is also noted that during the transition from the step 1 to the step 2 the first blade 305 moves from the half-space A to the half-space B and the second blade 305 is positioned in the half-space A. From step 2 onwards, until the return to the starting condition, that is to step 1, the first blade 305 will move in the half-space B and the second blade 305 in the half-space A. A further 90° rotation of the shaft 302 around the axis Y2 involves the passage from the step 2 to the step 3. In the step 3, the pair of blades 305 returns to be vertical, with the second blade 305 in the half-space C having the normal to the surface outgoing from the sheet and the first blade 305 in the half-space D with the normal to the surface oriented towards the left. With a further rotation of 90° of the shaft 302 around the axis Y2, the system passes from step 3 to the step 4, in which the pair of blades 305 returns to the horizontal position. The first blade 305 in the half-space B on the right of the shaft 302 with the normal to the surface outgoing from the sheet, and the second blade 305 on the left of the shaft in the half-space A with the normal to the surface facing upward. By means of a further 90° rotation of the shaft 302 around to the axis Y2 the system passes from the step 4 to the step 1 with the restoration of the initial conditions of operation.

Also in this third embodiment, the blades 305 are perpendicular (the two normal are at 90 degrees).

According to the third embodiment, the system comprises only one pair of left blades.

According to the third embodiment, the blades perform a complete rotation around the axis of the pins 312.

Advantageously according to the invention, the axes X, X2 and Y1, Y2 may coincide respectively with the separation plans C-D and A-B.

Advantageously according to the invention, in all the embodiments of the system with orbiting axis for converting energy the blades and the transmission shafts have the same angular velocity during operation.

Advantageously according to the invention, the system with orbiting axis for converting energy may also be used in mixing machines, industrial or domestic, allowing for more efficient mixing and amalgamation of mixture to prepare.

Therefore, the system with orbiting axis for converting energy according to the invention allows to orient the sectorial blades alternately, each in its own allotted space, and in an automatic way in the direction of the fluid, thus maximizing energy efficiency, both in reception in transmission.

Another advantage of the system with orbiting axis for converting energy according to the invention is the simplicity of construction and assembly.

Furthermore, the system with orbiting axis for converting energy according to the invention is of low cost.

Finally, the system with orbiting axis for converting energy according to the invention is versatile and reconfigurable, being able to vary the number of sectorial blades and of transmission and synchronization means.

Finally, it is clear that the system with orbiting shaft axis for converting energy described and illustrated here can be modified and varied without departing from the protective scope of the present invention.

The invention claimed is:

1. A system with orbiting axis for converting energy from a fluid comprising:
   at least an inner transmission shaft and at least an output transmission shaft;
   at least one support element;
   at least one sectorial blade configured to exchange energy with the fluid, the at least one sectorial blade being connected to said at least one inner transmission shaft by the at least one support element which is pivotable such that said at least one sectorial blade is configured to rotate around an axis of the inner transmission shaft;
   at least one transmission group for synchronization and transmission of rotation-oscillation movement to said at least one blade, the at least one transmission group comprising:
      the inner transmission shaft and the output transmission shaft;
      at least one pin;
      first rotation means rigidly connected, at a first extremity, with the support element by the at least one pin and, at a second extremity, to one of the transmission shafts, the first rotation means hinging the at least one support element to the at least one inner transmission shaft, each blade being configured to perform the rotation-oscillation movement integrally to the support element and resulting always oriented in a direction of the fluid.

2. The system according to claim 1, wherein the at least one sectorial blade includes a first sectorial blade and a second sectorial blade ninety degrees out of phase with respect to the first sectorial blade, said first sectorial blade being located in a first sector of space and said second horizontal sectorial blade being located in a second sector adjacent to the first sector.

3. The system according to claim 1, wherein the inner transmission shaft has an axis perpendicular to an axis of the at least one pin.

4. The system according to claim 1, wherein said at least one transmission group comprises a first toothed wheel keyed on said transmission shaft and a second toothed wheel keyed on said output transmission shaft, said second toothed wheel being connected to a top end of said output transmission shaft and rigidly connected to the first toothed wheel.

5. The system according to claim 1, wherein:
   the first rotation means includes an internal hinge; and
   said at least one transmission group comprises a first toothed wheel coaxial with said at least one inner transmission shaft and lateral second and third toothed wheels rigidly connected to the internal hinge and meshing, every 180° alternately, the first toothed wheel.

6. The system according to claim 1, wherein:
   the at least one sectorial blade includes a first sectorial blade and a second sectorial blade in opposite sectors of space and rotated out of phase by 90°; and
   the first rotation means include a first toothed wheel and a second toothed wheel respectively coupled to the first and second sectorial blades, in such a way that, rotating, the first and second sectorial blades occupy different sectors according to an orbital motion.

7. The system according to claim 1, wherein the at least one sectorial blade comprises a single sectorial blade, the system further comprising a counterweight placed at 90° or at 180° with respect to the blade.

8. The system according to claim 1, wherein the system is made in at least one material comprised in the group consisting of:
   metal;
   alloys;
   plastic material;
   composite material.

9. A fluid machine comprising the system with orbiting axis for converting energy from a fluid according to claim 1.

10. The fluid machine according to claim 9, wherein the fluid machine is a driving machine or a machine tool.

* * * * *